United States Patent [19]

Brown

[11] Patent Number: 5,295,017
[45] Date of Patent: Mar. 15, 1994

[54] SAMPLE MASKING USING WAVELENGTH-SELECTIVE MATERIAL

[75] Inventor: David C. Brown, Boston, Mass.

[73] Assignee: Bio-Rad Laboratories, Inc., Hercules, Calif.

[21] Appl. No.: 937,328

[22] Filed: Aug. 27, 1992

[51] Int. Cl.$^5$ .......................... G02B 5/20; G02B 21/06
[52] U.S. Cl. ..................................... 359/350; 250/339; 359/353; 359/389
[58] Field of Search ............... 359/350, 351, 353, 359, 359/230, 233, 889, 387, 388, 389; 250/338.1, 339

[56] References Cited

U.S. PATENT DOCUMENTS

| | | | |
|---|---|---|---|
| 3,558,221 | 1/1971 | Jessup | 359/350 |
| 3,610,735 | 10/1971 | Girard | 359/233 |
| 4,158,504 | 6/1979 | De Ponteves et al. | 359/353 |
| 4,280,057 | 7/1981 | Takahama et al. | 359/353 |
| 4,810,077 | 3/1989 | Sting | 359/387 |
| 4,893,886 | 1/1990 | Ashkin et al. | 359/350 |
| 4,922,282 | 5/1990 | Koyama et al. | 359/350 |
| 5,035,472 | 7/1991 | Hansen | 359/350 |
| 5,084,780 | 1/1992 | Phillips | 359/353 |
| 5,089,909 | 2/1992 | Kleinberg | 359/387 |
| 5,239,409 | 8/1993 | Doyle et al. | 359/351 |

FOREIGN PATENT DOCUMENTS

493777A2  8/1992  European Pat. Off. .

*Primary Examiner*—Martin Lerner
*Attorney, Agent, or Firm*—Townsend and Townsend Khourie and Crew

[57] ABSTRACT

An adjustable masking mechanism for use in connection with the exposure of a sample to a beam of analytical radiation and a beam of viewing radiation that facilitates aligning the movable elements of the mask with the edges of the sample. Whereas the prior art mechanisms utilize materials that are opaque to both the analytical radiation and the viewing radiation, the present invention uses one or more movable elements that are substantially opaque to the analytical radiation and at least partially transmissive to at least a portion of the spectral range of the viewing radiation.

19 Claims, 5 Drawing Sheets

SAMPLE MASKING USING WAVELENGTH-SELECTIVE MATERIAL

BACKGROUND OF THE INVENTION

The present invention relates to techniques for providing visual inspection of samples that have analytical radiation incident thereon.

When making a sample measurement either in transmission or in reflectance, it is important to know the exact portion of the sample exposed to the measuring beam. This is especially critical where high spatial resolution is required, as for example in an optical microscope. In the case of measurements made through a microscope in particular, the means by which the desired area of the sample is identified and positioned for measurement depends, in general, on the ability of the operator to see the entire sample, either directly in the microscope eyepiece or indirectly on a television monitor screen or other remote viewing device. For this purpose, such microscopes are provided with an illuminator whose radiation is in the visible portion of the optical spectrum, and are designed to transmit that radiation to the operator along a path which assures virtual coincidence with the path of the analytical radiation, which may be from a region of the spectrum which is not visible.

In the general case, the sample area of interest is smaller than the field of view of the measuring system, and is mounted on a support whose optical characteristics are different from those of the sample itself, or are unknown. It is therefore desirable that the measured region be restricted to the sample alone. However, the sample area may be quite small in both absolute and relative terms. Since the signal-to-noise ratio of the measurement is proportional to the area of the sample measured (because the noise is independent of the sample area while the signal is directly proportional to it), it is desirable that all of the sample be included.

A typical prior art approach is to place an adjustable mask in a viewable image plane. The mask typically includes a number of opaque elements (typically blackened metal sheets) that can be moved in the image plane relative to the image of the sample so as to block selected portions of the field of view. In use, the area of sample to be measured is centered in the measuring field of view by visual means, and the mask is adjusted, also by visual means, to just exclude all the non-sample background.

The mask may be of the adjustable diaphragm type whose geometry is restricted to a circle of adjustable radius, in general greater than zero, although double-diaphragm designs can provide extinction. Alternatively, the mask may be a four-blade device in which pairs of opposed blades are arranged orthogonally in parallel displaced planes. This device is more generally useful, because it will go to complete extinction, and its rectangular geometry can be adjusted to more nearly match the geometry of most samples, which are not usually circular in projection.

Unfortunately, it is not always easy to adjust the mask to be just tangent to the side of a sample. This is a particular problem if the sample is dark, in which case, it may be almost impossible to determine the point at which the mask is just tangent to the sample.

Several prior art microscope designs, such as that of Horiba, partially solve the problem by providing a separate visual pathway around the mask. The visual images of the sample both through and around the masking device are combined in the eyepiece focal plane by means of a complex arrangement of beamsplitters and mirrors, while the measurement beam is restricted to pass through the mask assembly only. This solution allows the operator to see the open region of the mask superimposed on the sample, and should, in principle permit exact adjustment of the mask to tangency with the outline of the desired sample area. However, in practice it is not possible to align all of these extra optics, some of which must be moved out of the way of the measuring beam, so that perfect virtual coincidence with the measuring beam is assured. As a result, even though the mask appears to be perfectly aligned with the sample, either some sample area is excluded from the measuring beam, or some background is included in the measuring beam.

Thus, the prior art provides a choice between a relatively straightforward system that may be difficult or impossible for the user to adjust, and a more complicated and expensive system that is apparently easy for the user to adjust, but may give spurious results.

SUMMARY OF THE INVENTION

The present invention provides an adjustable masking mechanism for use in connection with the exposure of a sample to a beam of analytical radiation and a beam of viewing radiation that facilitates aligning the movable elements of the mask with the edges of the sample.

Whereas the prior art mechanisms utilize mask materials that are opaque to both the analytical radiation and the viewing radiation, the present invention uses one or more movable elements that are substantially opaque to the analytical radiation and at least partially transmissive to at least a portion of the spectral range of the viewing radiation. In the present context, the term "viewing radiation" refers to radiation that can be used to illuminate the sample field of view and can ultimately be seen as a visible image. In the normal instance, the viewing radiation is visible light.

In specific embodiments, the masking mechanism is a four-blade mechanism or an adjustable diaphragm, and the blades are glass with a coating composed of a number of dielectric and metal layers. During alignment the user sees the image of the sample at full intensity through the mask's adjustable aperture and sees possible blocked portions of the sample at somewhat reduced intensity through the mask blades. Thus, the present invention provides the advantages of the more complicated systems that provide simultaneous viewing of the mask and the sample, while retaining the relative simplicity of more straightforward optical configurations.

A further understanding of the nature and advantages of the present invention may be realized by reference to the remaining portions of the specification and the drawings.

DESCRIPTION OF SPECIFIC EMBODIMENTS

Figure 1:
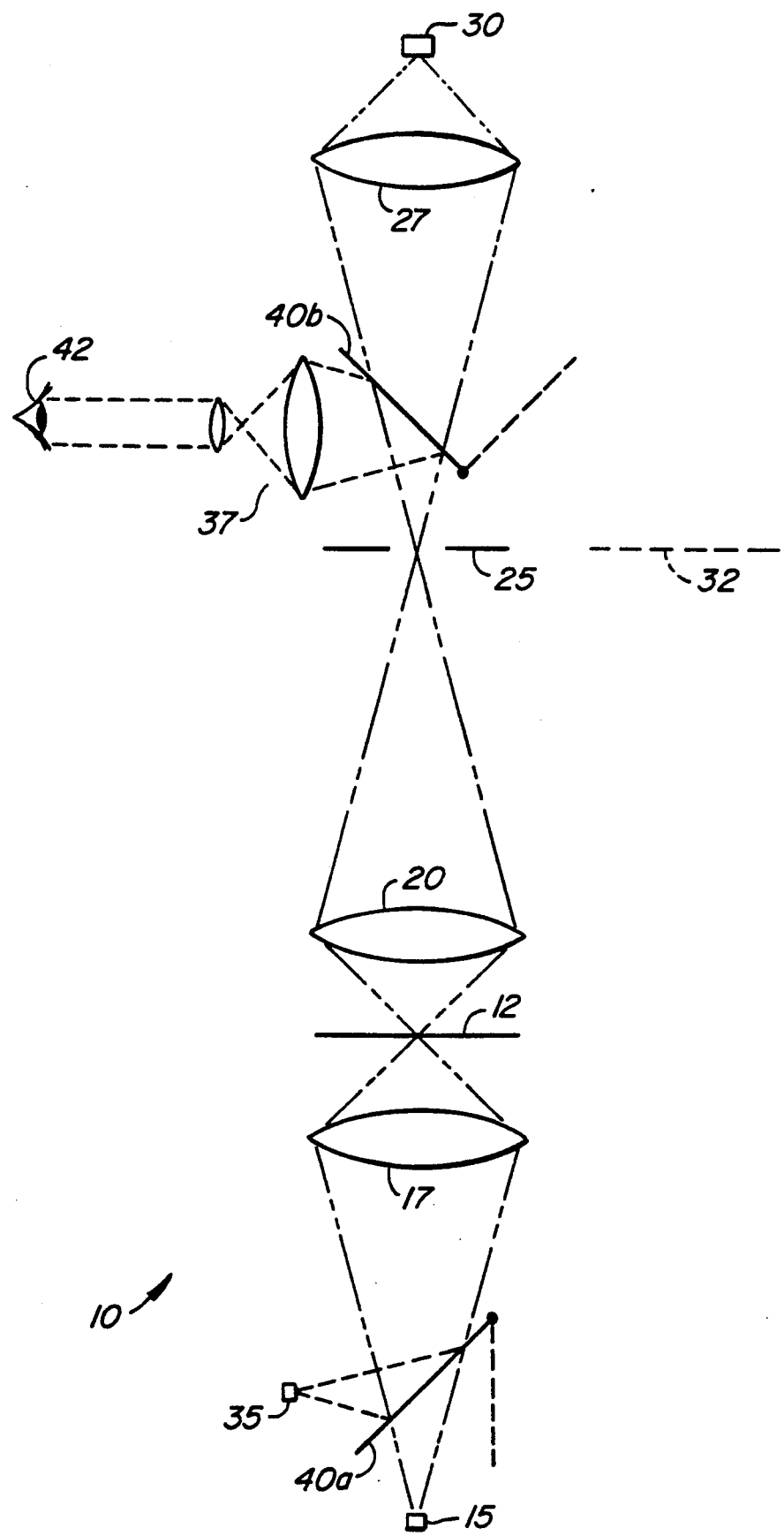
FIG. 1 is an optical schematic of an optical instrument for making transmission measurements of a sample using the masking system of the present invention.

FIG. 1 is an optical schematic of an optical instrument such as an infrared microscope, the purpose of which is to illuminate a sample 12 with a beam from a source 15 of analytical radiation and obtain desired measurements therefrom. The instrument is provided with an optical train for the analytical radiation and partly overlapping optical train for visual alignment. The figure shows a transmission measurement, but it will be apparent to those of skill in the art that a similar optical setup can be provided for reflectance measurements.

The optical train for the analytical radiation includes a condenser 17, an objective 20, a mask mechanism 25, measurement optics 27 and a detector 30. Condenser 17 collects the radiation from source 15 and focuses the radiation on the sample. Objective 20 collects the radiation emanating from the sample and images the sample at an image plane 32. Mask 25 is located in this plane and limits the field of view. The radiation passing through the mask is collected by measurement optics 27 and focused on detector 30, which is sensitive to the analytical radiation in the wavelength range of interest. The figure is stylized; for example, an actual infrared microscope would typically have reflecting optics rather than lenses as shown.

An auxiliary visual alignment system aids the user in aligning the sample and the mask. A source 35 of viewing radiation is coupled into the analytical optical path by a first movable mirror 40a and the viewing radiation passes through condenser 17, sample 12, objective 20, and mask 25, and is deflected from the analytical optical path by a second movable mirror 40b. The deflected viewing radiation is collected by viewing optics 37, such as an eyepiece and is shown as being directed to the viewer's eye 42.

The alignment and measurement take place during different time intervals. During the alignment phase, source 15 may be on or off, source 35 is turned on, and mirrors 40a and 40b are disposed in the positions shown in solid lines so as to couple the viewing radiation into and deflect it out of the analytical path. During the measurement phase, source 15 is turned on, source 35 may be on or off, and the mirrors are disposed in the positions shown in dotted lines so that only the analytical radiation passes through the sample.

A fundamental aspect of the present invention is that mask 25, shown schematically in this figure, includes one or more elements, movable relative to the sample image, that are substantially opaque to the analytical radiation but at least partially transmissive to at least some of the viewing radiation. In this context, the viewing radiation is typically visible light, but in the event that a television camera or other viewing device is used, the viewing radiation may be in any wavelength range that can be converted to a visible image for inspection by the user. Similarly, the analytical radiation is often invisible (typically infrared, but also possibly other invisible parts of the spectrum), but this is not necessary for practicing the present invention.

In the specific embodiment, the mask elements comprise a glass substrate, approximately 0.775 micron thick, having deposited thereon a sequence of thin layers. A 0.01 micron layer of thorium fluoride is deposited as a bonding agent, followed by eight 0.10-micron layers of zinc sulfide interspersed with seven 0.01-micron layers of metallic silver. A 0.10-micron layer of sapphire is provided as the top layer since this material is highly abrasion-resistant.

Figure 2:
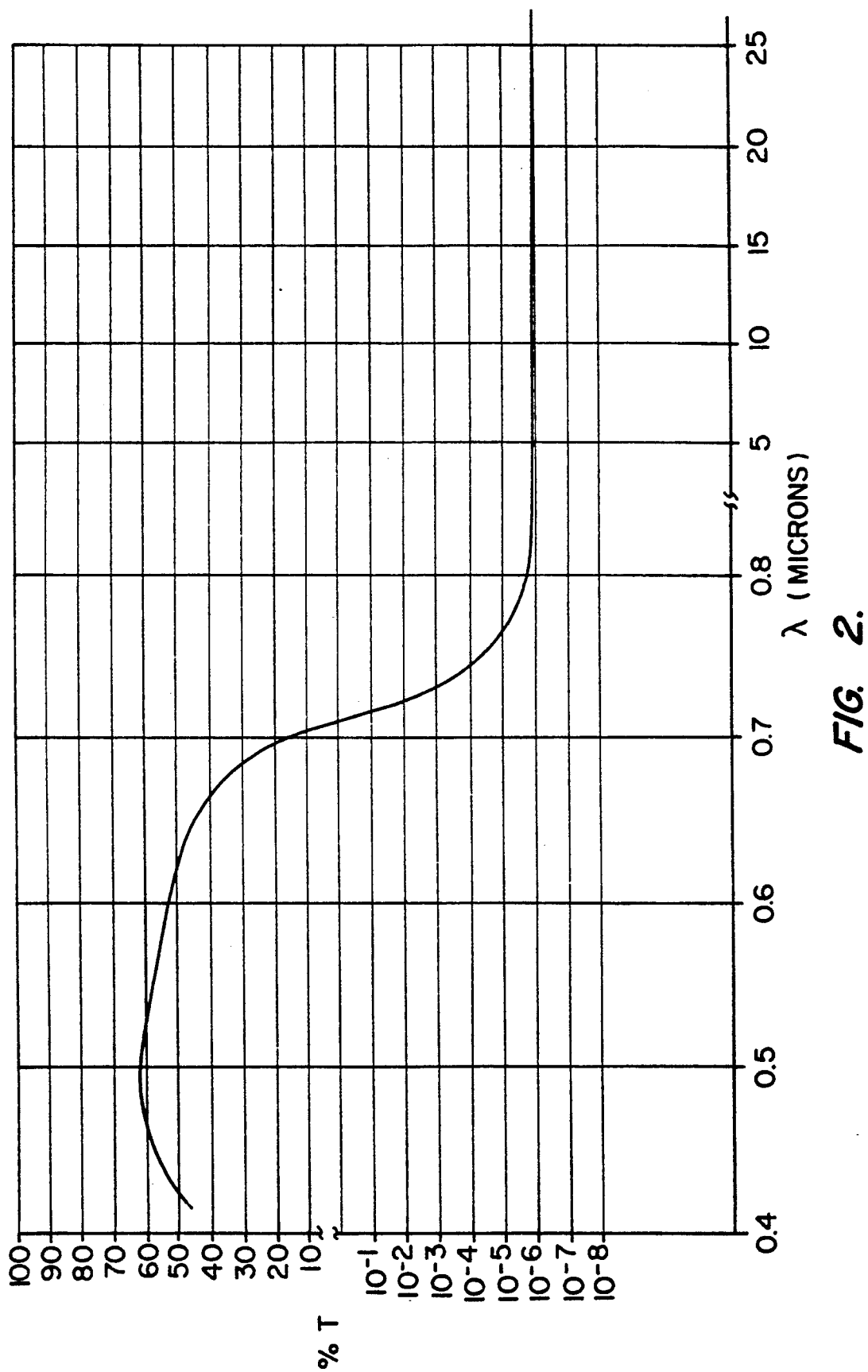
FIG. 2 is a plot of the transmission coefficient as a function of wavelength for a specific embodiment of the invention.

FIG. 2 is a plot of the transmission coefficient, (expressed as a percentage) as a function of wavelength for this particular coating structure. The transmission coefficient and wavelength scales are interrupted. As can be seen, the transmission coefficient is on the order of 40-60% over the visible range, and falls by more than 7 orders of magnitude for the near infrared and beyond. Thus, in the alignment phase, with mirrors 40a and 40b interposed in the optical path, the visibly illuminated sample is seen at substantially full intensity within the mask's adjustable aperture and at somewhat reduced intensity outside the mask aperture. This makes it possible for the user to adjust the mask so that nearly all the analytical radiation passing through the sample and nearly none of the analytical radiation passing around the sample reaches the detector. The fact that the mask material is less than fully transmissive to the visible light is actually advantageous since the edges of the mask are more readily visible due to the contrast between the full intensity passing through the aperture of the mask and the somewhat reduced intensity passing through the mask elements themselves.

Figure 3A:
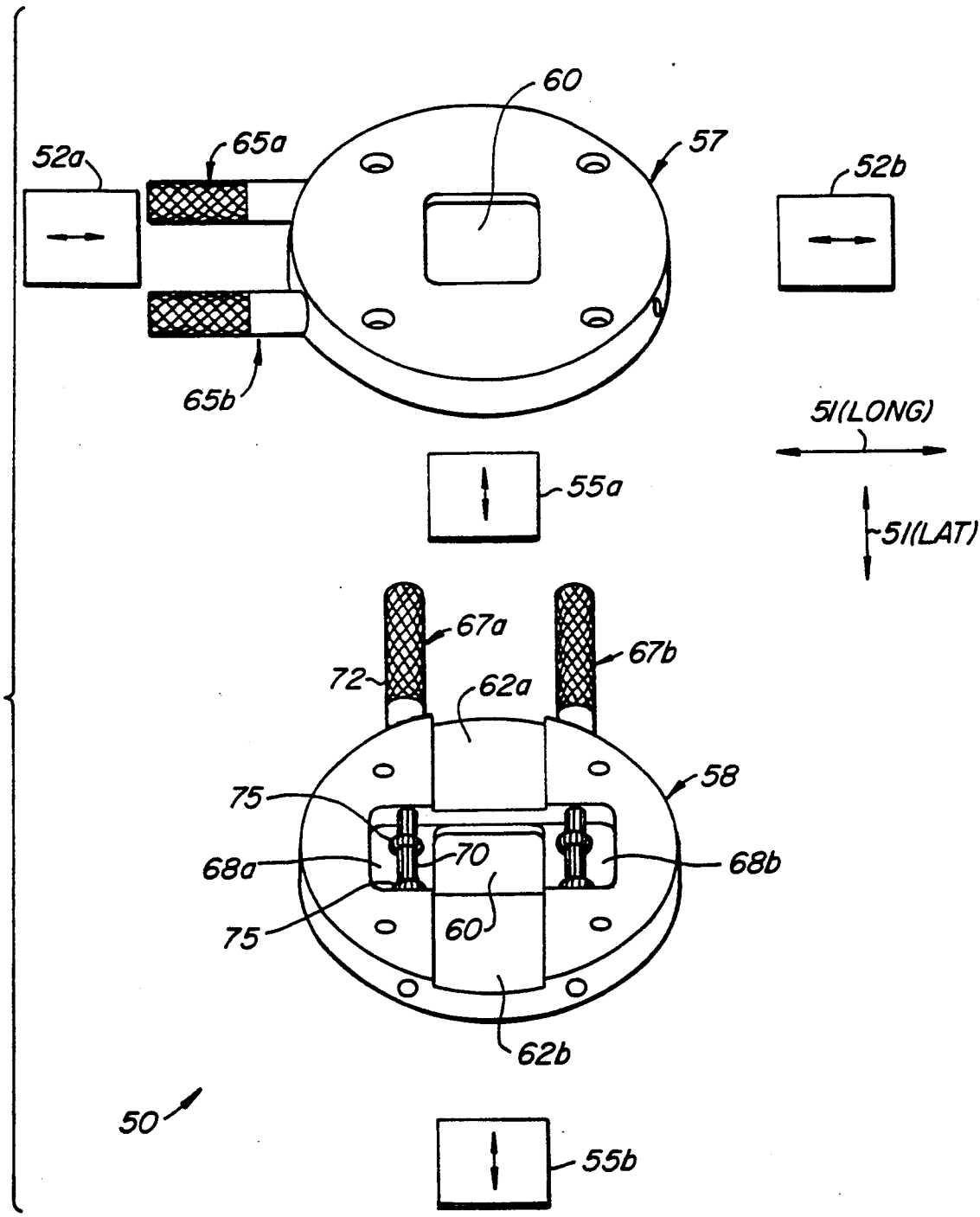
FIG. 3A is an exploded view of a four-blade mechanism embodying the invention.

FIG. 3A is an exploded isometric view of a four-blade mask mechanism 50 that provides a first embodiment of the present invention. For purposes of description, references to longitudinal movement will be taken to mean movement parallel to an axis 51(LONG) in a horizontal direction in the plane of the figure, while references to lateral or transverse movement will mean movement parallel to an axis 51(LAT) perpendicular to axis 51(LONG). Axis 51(LAT) is schematically shown as vertical in the plane of the figure.

The mechanism includes a first pair of blades 52a and 52b that undergo relative longitudinal movement and a second pair of blades 55a and 55b which undergo relative lateral movement. The type of movement undergone by the blades is shown schematically as double-headed arrows on the blades. The blades are supported and their motion constrained by a matched pair of plate-like support elements 57 and 58 that lie in spaced parallel planes. The elements are substantially identical, and are oriented so that corresponding structure on one faces the corresponding structure on the other, and one is rotated 90° relative to the other in its respective plane. Since the two elements are bolted together, it is convenient to regard them as having outer and inner surface with the upper surface of element of 57 being an outer surface and the upper surface of element 58 being an inner surface.

Each support element is formed with a central aperture 60 that defines that maximum aperture of the mask mechanism. Support element 58 will now be described since its relevant structure is visible in the figure. The inner surface of element 58 is formed with a pair of channels 62a and 62b of a depth corresponding to the thickness of blades 55a and 55b and a width corresponding to the width of blades 55a and 55b, which are thus constrained to slide in the lateral direction. Support element 57 is formed with similar channels which are not shown since they are hidden from view, but they are disposed at 90° (extending in the longitudinal direction).

Each support element carries a pair of motion assemblies for imparting motion to the blades that are guided by the channels in the other support element. Specifically, support element 57 carries motion assemblies 65a and 65b for imparting motion to blades 55a and 55b, while support element 58 carries motion assemblies 67a and 67b for imparting motion to blades 52a and 52b. The detailed structure is best seen with respect to motion assemblies 67a and 67b. The inner surface of support element 58 is formed with recesses 68a and 68b that extend longitudinally away from the central aperture. Motion assembly 67a comprises a shaft 70 which extends laterally along either side of channels 62a and 62b and has a knurled handle 72, which the user engages to impart rotation to the shaft. The shaft carries a pair of frictional rollers 75 sized to intrude slightly above the top surface of support element 58. The rollers may be elastomeric O-rings seated in circumferential grooves in the shaft. The other motion assemblies are similarly configured.

Thus, when the blades and the support elements with their rotatably-mounted motion assemblies are assembled by screws (not shown), blades 55a and 55b are captured in recesses 62a and 62b and constrained from above by the lower surface (not shown) of support element 57. The rollers that are parts of motion assemblies 65a and 65b engage blades 55a and 55b so that rotating the knurled handles causes lateral movement to any desired degree.

The general structural configuration of mechanism 50 is basically the same as prior art mechanisms, but with the important exception that blades 52a, 52b, 55a, and 55b are not made of blackened metal, but rather are made of a material that is substantially opaque to the analytical radiation (typically infrared), but significantly transmissive to the viewing (typically visible) radiation. A representative material was described above.

The prior art movable blades were required to be precision-ground to a knife edge to avoid diffraction effects, which added to the cost. The coated glass substrates used for the current embodiment do not require precision machining. Therefore, the mask mechanism of the invention is less expensive than the prior art mechanism.

Figure 3B:
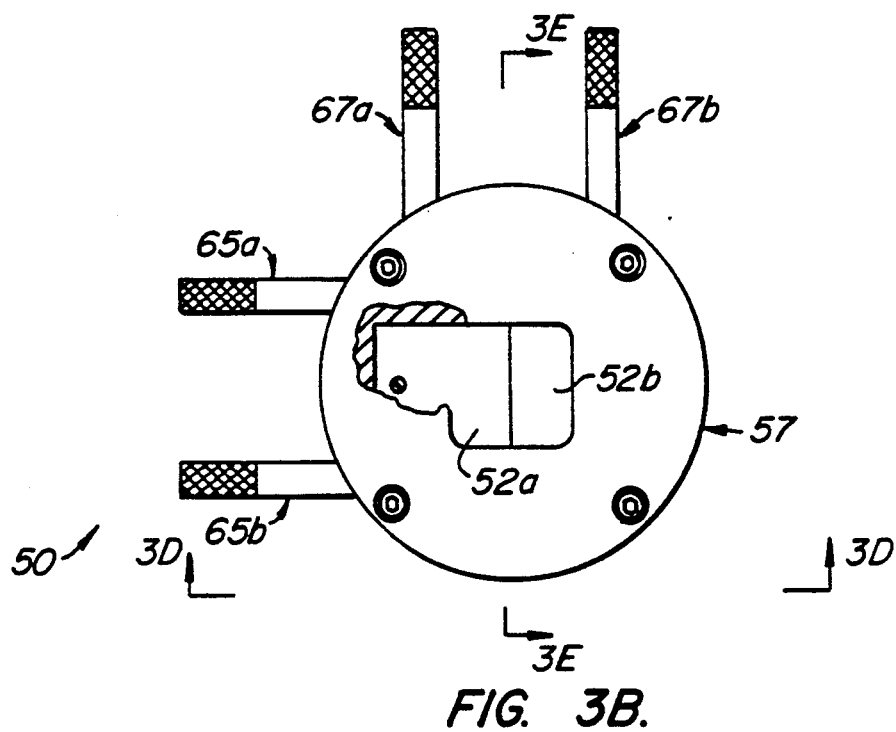
FIGS. 3B-3E are exploded, top, bottom, side, and sectional views of the four-blade mechanism.
Figure 3C:
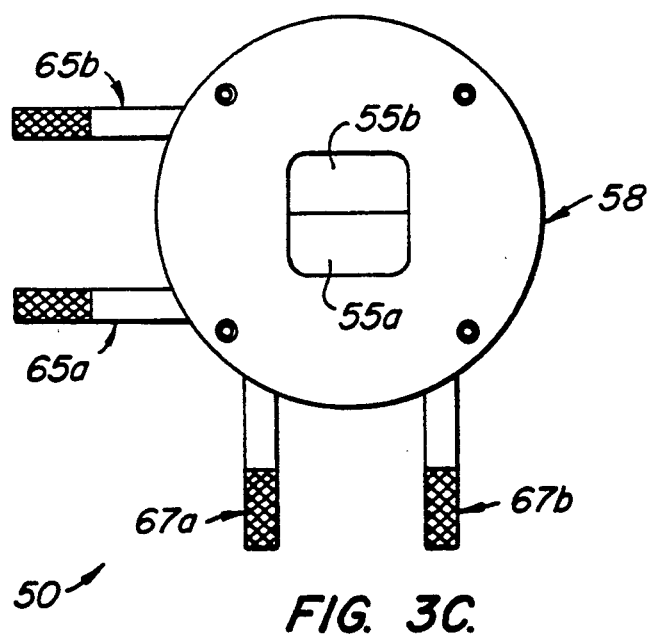
Figure 3D:
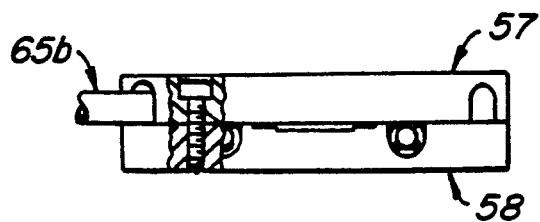
Figure 3E:
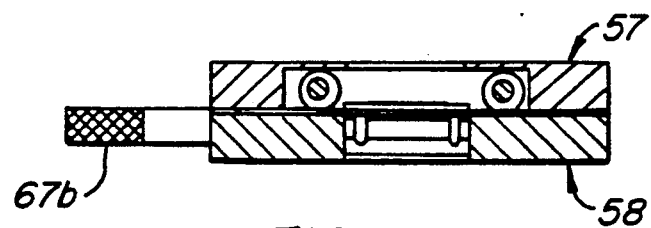

FIG. 3B is a partially cut away top view of four-blade mechanism 50 in its assembled state. FIG. 3C is a bottom view. In both views, the blades are moved to their respective abutting positions to entirely block the aperture. A suitable rotation of the knurled handles can move the blades into any desired relative position. FIG. 3D is a side view, looking along line 3D—3D in FIG. 3B, partially cut away to show the set screw assembly). FIG. 3E is cross-sectional view taken through line 3E—3E of FIG. 3B, showing the relationship of the rollers and the shafts in the motion assemblies when the entire device is assembled.

Figure 4A:
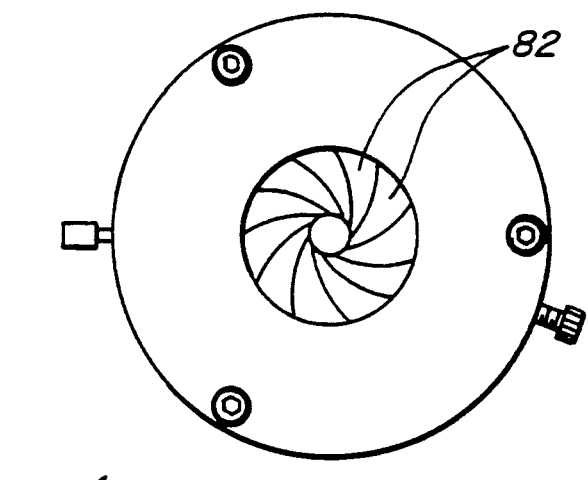
FIGS. 4A-B are top and side views of a diaphragm mechanism embodying the invention.
Figure 4B:
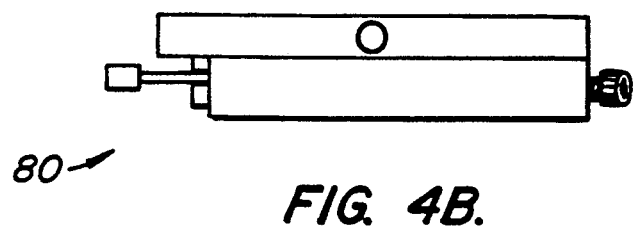

FIGS. 4A and 4B are top and side views of an iris diaphragm mechanism embodying the present invention. The mechanism is conventional except that the diaphragm blades, designated 82, are not of the blackened metal construction of the prior art, but rather of the coated glass substrate construction described above.

In conclusion, it can be seen that the present invention provides a straightforward and effective technique to improve the ability to mask a sample for optical analysis. The invention can be adapted to existing mechanisms and actually represents a cost saving over such mechanisms.

While the above is a complete description of specific embodiments of the invention, various modifications, alternative constructions, and the like may be used. For example, the description was in terms of invisible analytical radiation and visible light for illumination during the alignment phase. Alternatively, it could be that the visual illumination is in one portion of the visible spectrum and the analytical radiation is in another portion of the visible spectrum. Additionally, while an adjustable mask is described, the present invention could be implemented as a fixed-aperture mask to the extent that a fixed aperture mask was otherwise useful. Moreover, while the present invention is described in the context of a microscope, it can be used in other instruments such as spectrometers and the like. However, the critical capability is most likely to be important in situations requiring high spatial resolution (such as a microscope with diffraction-limited optics).

Therefore, the above description and illustrations should not be taken as limiting the scope of the invention which is defined by the claims.

What is claimed is:

1. A method of masking a sample for analysis in an optical instrument comprising the steps of:
   exposing the sample to a source of viewing radiation;
   focusing the viewing radiation emanating from the sample in an image plane;
   exposing the sample to a source analytic radiation;
   focusing the analytic radiation emanating from the sample in the image plane;
   providing a masking mechanism including at least one mask element, movable in the image plane, that is substantially opaque to the analytical radiation and at least partially transmissive to at least a portion of the spectral range of the viewing radiation; and
   adjusting the mask element relative to an image of the sample in the image plane while the sample is exposed to viewing radiation, whereby the image of the sample including any portions of the image of the sample that are formed by viewing radiation that encounters the mask element can be seen, analytic radiation that encounters the mask element while the sample is exposed to analytic radiation is blocked.

2. The method of claim 1 wherein the spectral range of the viewing radiation is at least partly in the visible spectrum.

3. The method of claim 1 wherein the spectral range of the analytical radiation is at least partly in the infrared spectrum.

4. The method of claim 1 wherein the element is a coated glass substrate.

5. An optical instrument comprising:
   an optical train, including a source of analytical radiation, for exposing a sample to a beam of analytical radiation and for collecting analytical radiation emanating from the sample for detection, said optical train having a particular plane in which the analytical radiation is focused;
   a viewing system, including a source of viewing radiation, for exposing the sample to a beam of viewing radiation, said viewing system operating to focus said viewing radiation in said particular plane;
   a support structure having an aperture, the support structure configured to be mounted in the optical instrument so that the beam of analytical radiation and the beam of viewing radiation pass through the aperture; and an element mounted to said support structure for movement in said particular plane over a set of positions wherein said element intercepts different areas of said aperture, said element being substantially opaque to the analytical radiation and at least partially transmissive to at least a portion of the spectral range of the viewing radiation.

6. The optical instrument of claim 5 wherein said element is a coated glass substrate.

7. The optical instrument of claim 5, and further comprising:

an additional element mounted to said support structure for movement in said particular plane over a set of positions wherein said element intercepts different areas of said aperture, said additional element being substantially opaque to the analytical radiation and at least partially transmissive to at least a portion of the spectral range of the viewing radiation.

8. The optical instrument of claim 7 wherein said first-mentioned and additional elements are movable into at least one abutting relationship wherein said first-mentioned and additional elements together intercept substantially the entire area of said aperture.

9. The optical instrument of claim 7 wherein said first-mentioned and additional elements overlap each other in at least some of said positions.

10. The optical instrument of claim 5 wherein the spectral range of the viewing radiation is at least partly in the visible spectrum.

11. The optical instrument of claim 5 wherein the spectral range of the analytical radiation is at least partly in the infrared spectrum.

12. An optical instrument for analyzing a sample using analytical radiation, comprising:

an optical train, including a source of analytical radiation, for exposing the sample to a beam of analytical radiation and for collecting analytical radiation emanating from the sample for detection, said optical train having a particular plane in which the analytical radiation is focused;

a viewing system, including a source of viewing radiation, for exposing the sample to a beam of viewing radiation, said viewing system operating to focus said viewing radiation in said particular plane;

a support structure having an aperture, the support structure being mounted in the optical instrument so that the beam of analytical radiation and the beam of viewing radiation pass through the aperture; and an element mounted to said support structure for movement in said particular plane between a first position wherein said element intercepts a minimum area of said aperture and a second position wherein said element intercepts a maximum area of said aperture, said element being substantially opaque to the analytical radiation and at least partially transmissive to at least a portion of the spectral range of the viewing radiation.

13. The optical instrument of claim 12 wherein said suitable plane is an image plane for the sample.

14. The optical instrument of claim 12 wherein said element is a coated glass substrate.

15. The optical instrument of claim 12, and further comprising:

an additional element mounted to said support structure for movement between a third position wherein said additional element intercepts a minimum area of said aperture and a fourth position wherein said additional element intercepts a maximum area of said aperture, said additional element being substantially opaque to the analytical radiation and at least partially transmissive to at least a portion of the spectral range of the viewing radiation.

16. The optical instrument of claim 15 wherein said first-mentioned and additional elements are movable into at least one abutting relationship wherein said first-mentioned and additional elements together intercept substantially the entire area of said aperture.

17. The optical instrument of claim 15 wherein said first-mentioned and additional elements overlap each other in said first and third positions and in said second and fourth positions.

18. The optical instrument of claim 12 wherein the spectral range of the viewing radiation is at least partly in the visible spectrum.

19. The optical instrument of claim 12 wherein the spectral range of the analytical radiation is at least partly in the infrared spectrum.

* * * * *